(12) United States Patent
Hasegawa

(10) Patent No.: US 8,488,702 B2
(45) Date of Patent: Jul. 16, 2013

(54) MIMO-OFDM TRANSMITTER

(75) Inventor: Tsuyoshi Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 834 days.

(21) Appl. No.: 11/653,978

(22) Filed: Jan. 17, 2007

(65) Prior Publication Data

US 2007/0253504 A1    Nov. 1, 2007

(30) Foreign Application Priority Data

Apr. 28, 2006 (JP) .................................. 2006-126537

(51) Int. Cl.
*H04L 1/02* (2006.01)

(52) U.S. Cl.
USPC ........................................................ 375/267

(58) Field of Classification Search
USPC ..... 375/267, 299, 347, 349; 700/53; 455/101, 455/132–141
See application file for complete search history.

(56) References Cited

U.S. PATENT DOCUMENTS

| | | | |
|---|---|---|---|
| 6,463,097 B1 | 10/2002 | Held et al. | |
| 6,556,558 B1 | 4/2003 | Sari | |
| 6,646,980 B1 | 11/2003 | Yamamoto et al. | |
| 6,668,010 B1* | 12/2003 | Minematsu | 375/145 |
| 6,687,233 B1 | 2/2004 | Chen et al. | |
| 7,065,144 B2* | 6/2006 | Walton et al. | 375/260 |
| 8,090,039 B2* | 1/2012 | Fujii | 375/267 |
| 8,169,889 B2 | 5/2012 | Walton et al. | |
| 2004/0065718 A1 | 4/2004 | Kubokawa et al. | |
| 2004/0179627 A1* | 9/2004 | Ketchum et al. | 375/267 |
| 2005/0073976 A1 | 4/2005 | Fujii | |
| 2005/0127143 A1 | 6/2005 | Kubokawa et al. | |
| 2005/0265275 A1* | 12/2005 | Howard et al. | 370/328 |
| 2006/0098569 A1* | 5/2006 | Han et al. | 370/208 |
| 2006/0153282 A1* | 7/2006 | Jung et al. | 375/146 |
| 2006/0193298 A1 | 8/2006 | Kishigami et al. | |
| 2007/0197166 A1 | 8/2007 | Kawamoto et al. | |
| 2007/0201572 A1* | 8/2007 | Krauss et al. | 375/260 |
| 2008/0151743 A1* | 6/2008 | Tong et al. | 370/204 |

FOREIGN PATENT DOCUMENTS

| | | |
|---|---|---|
| EP | 1 650 891 A1 | 4/2006 |
| JP | 2000-138974 | 5/2000 |
| JP | 2000-332725 | 11/2000 |
| JP | 2000-349736 | 12/2000 |
| JP | 2002-528958 | 9/2002 |
| JP | 2003-503934 | 1/2003 |
| JP | 2004-179615 | 6/2004 |
| JP | 2004/253925 | 9/2004 |
| JP | 2005-65242 A | 3/2005 |

(Continued)

OTHER PUBLICATIONS

Japanese Office Action mailed Jul. 12, 2011 for corresponding Japanese Application No. 2006-126537, with English-language translation.

(Continued)

*Primary Examiner* — Khanh C Tran
(74) *Attorney, Agent, or Firm* — Fujitsu Patent Center

(57) ABSTRACT

A MIMO-OFDM transmitter has a plurality of transmitting antennas transmitting OFDM signals to a receiver, and a generating unit generating direct spreading pilot signals of which pilot data for demodulating the OFDM signals transmitted from the plurality of transmitting antennas in the receiver are spread with direct spreading codes, and transmitting the direct spreading pilot signals from the plurality of transmitting antennas.

4 Claims, 20 Drawing Sheets

FOREIGN PATENT DOCUMENTS

| | | |
|---|---|---|
| JP | 2005/110130 | 4/2005 |
| WO | WO-01/03319 | 1/2001 |
| WO | WO 2004/075436 | 9/2004 |
| WO | WO 2005/011167 | 2/2005 |
| WO | WO-2005/086402 A1 | 9/2005 |
| WO | WO-2005/114868 A1 | 12/2005 |

OTHER PUBLICATIONS

Japanese Office Action mailed Apr. 19, 2011 for corresponding Japanese Application No. 2006-126537, with English-language Translation.

Rahman, Quazi M. et al., "Channel Estimation Methods for Mimo-OFDM System: Time Domain Versus Frequency Domain," Electrical and Computer Engineering, Canadian Conference on Niagara Falls, vol. 2, May 2, 2004, pp. 689-692, XP010733540.

Yokomakura, Kazunari, et al., "A Channel Estimation Technique for Dynamic Parameter Controlled—OF/TDMA Systems," IEEE $16^{th}$ International Symposium on Personal, Indoor and Mobile Radio Communications, Jan. 1, 2005, pp. 644-648, XP031099823.

Extended European Search Report dated May 2, 2013 for corresponding European Application No. 07100631.6.

* cited by examiner

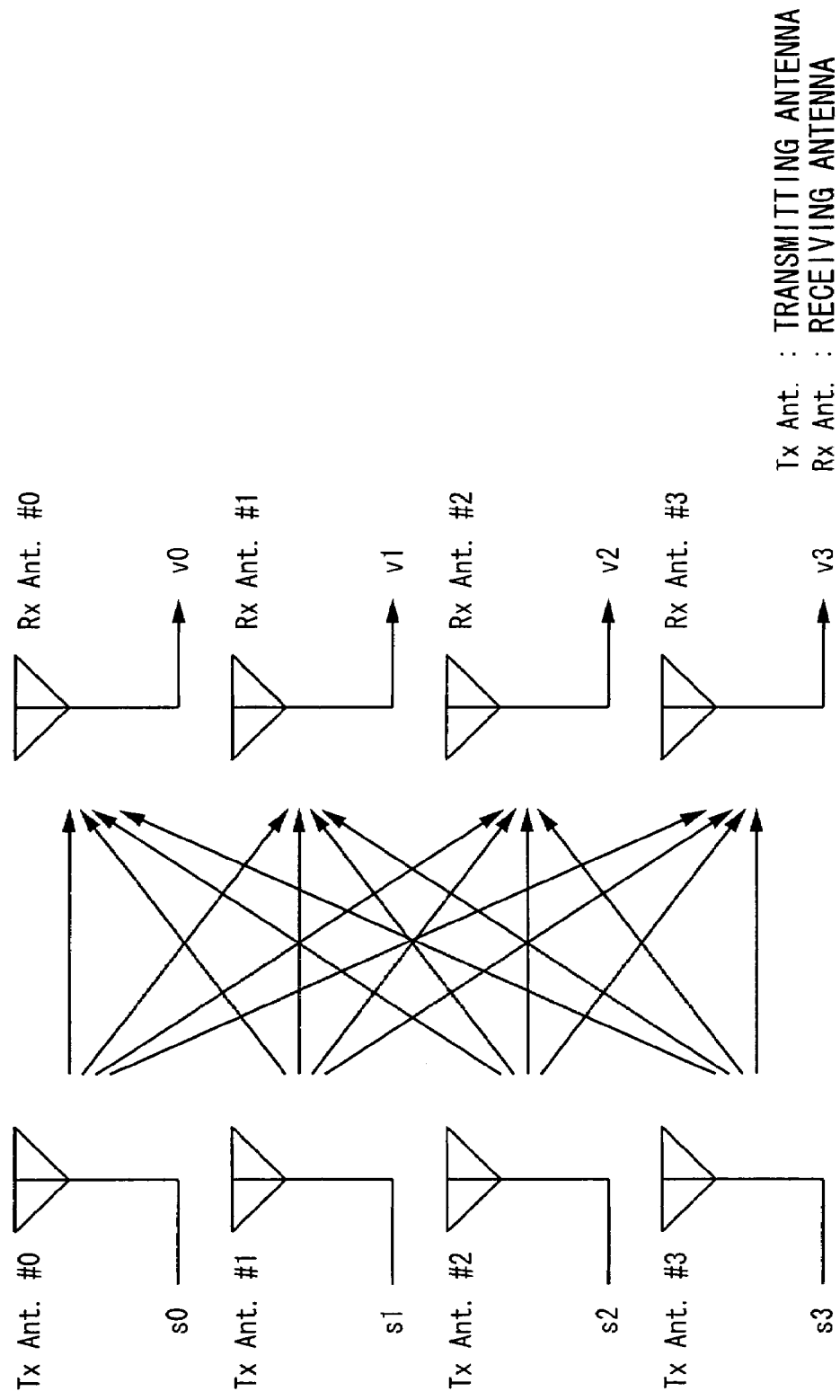
F I G. 19

MIMO-OFDM TRANSMITTER

BACKGROUND OF THE INVENTION

1. Technical Field

The present invention relates to a channel estimation method used for digital communications. The present invention relates particularly to a configuration of pilot channels or to a channel estimation unit in a wireless system that combines MIMO (Multi Input Multi Output) and OFDM (Orthogonal Frequency Division Multiplexing) with each other.

2. Background Art

There have been active researches and studies of a high-speed/large-capacity mobile communication system over the recent years, and the attention has been paid to a system that combines the MIMO and the OFDM with each other as a basic system thereof.

FIG. 16 is a diagram showing a basic configuration of an OFDM transmitter in an OFDM transmission system. Transmission data are mapped as frequency domain data of respective subcarriers by serial/parallel conversion. The frequency domain data undergo inverse Fourier transform into time domain waveform data. Transmitted next is an OFDM symbol organized by attaching (inserting), as a guard interval (GI), part of data of the trailing portion of this time domain to the head (of the symbol).

Herein, an in-depth description of the OFDM transmitter in FIG. 16 is given. A serial/parallel converting unit 101 converts inputted channel data into a frequency domain data of a subcarrier. The serial/parallel converting unit 101 outputs the frequency domain data to an inverse fast Fourier transform operation unit 102. The inverse fast Fourier transform (IFFT) operation unit 102 inverse-Fourier-transforms the inputted frequency domain data into time domain data. The inverse fast Fourier transform operation unit 102 outputs the time domain data to a guard interval inserting unit 103. The guard interval inserting unit 103 attaches (inserts), as the guard interval, part of data of the trailing portion of the time domain to the head (of the symbol). The data attached with the guard interval is defined as an OFDM symbol. The insertion of the guard interval (guard period) can reduce influence of interference, caused by multi-paths, between the OFDM symbols. The guard interval inserting unit 103 outputs the OFDM symbol to a digital/analog converting unit 104. The digital/analog converting unit 104 converts the OFDM symbol inputted from the guard interval inserting unit 103 into analog signals, and outputs the analog signals to an up-converting unit 105. The up-converting unit 105 up-converts the inputted analog signals into high-frequency signals. An amplifier 106 amplifies the high-frequency signals and transmits the amplified signals from the respective antennas 107.

FIG. 17 is a diagram showing a basic configuration of the OFDM receiver in the OFDM transmission system. The received time domain signals undergo extracting the individual OFDM symbols and removing the guard intervals (GIs) at the symbol timings obtained from the correlations of the guard intervals. The GI-removed signals are subjected to fast Fourier transform (FFT) and are thereby separated into the signals according to the subcarrier. The channel estimation unit obtains a channel estimation value for every subcarrier, and channel correction per subcarrier is conducted based on the channel estimation value, thereby obtaining a symbol value per subcarrier.

Herein, the OFDM received in FIG. 17 will be explained in detail. A down-converting unit 202 down-converts the high-frequency signals transmitted from the transmitter and received by the receiving antennas 201. An AGC (Auto Gain Control) amplifier 203 amplifies the down-converted reception signals. An analog/digital converting unit 204 converts the amplified reception signals into digital signals. A symbol timing detection unit 205 detects the timing of the OFDM symbol from the guard interval (GI). A guard interval removing unit 206 removes the guard intervals inserted by the transmitter from the digital signals.

A fast Fourier transform (FFT) operation unit 207 transforms the digital signals in the time domain into a plurality of subcarrier signals in the frequency domain. A channel estimation unit 208 makes channel estimation per subcarrier by use of the pilot signals that are time-multiplexed by the transmitter. A channel estimation value obtained by the channel estimation unit 208 is multiplied by an output of the fast Fourier transform operation unit 207, thereby correcting a channel fluctuation. A parallel/serial converting unit 209 converts the corrected parallel data into the serial data, thereby obtaining the serial channel data.

The channel estimation value is obtained from the pilot symbol of the known signals. FIG. 18 is a diagram showing an example of a frame structure. In this case, the data of four pieces of OFDM symbols are transmitted subsequent to two pieces of OFDM pilot symbols.

The OFDM is capable of greatly suppressing the interference, caused by the multi-paths etc, between the symbols by inserting the GIs. Further, a length of the OFDM symbol is relatively long, resulting in a less decline of the data transmission efficiency due to the insertion of the GIs.

FIG. 19 is a diagram showing the basic architecture of the MIMO. The MIMO provides a plurality of antennas on the transmitting side and the receiving side, respectively (the four antennas are provided on both of the transmitting and receiving sides in FIG. 19). When different pieces of data $s_0, s_1, \ldots, s_N$ are transmitted from the respective antennas on the transmitting side, the data are received in the form of these pieces of data being mixed together on the receiving side. Let $v_0, v_1, \ldots, v_N$ be the reception signals at that time, a relationship can be expressed as by the Formula (1).

[Mathematical Expression 1]

$$\begin{pmatrix} v_0 \\ v_1 \\ \vdots \\ v_{N-1} \end{pmatrix} = \begin{pmatrix} h_{00} & h_{01} & \cdots & h_{0(N-1)} \\ h_{10} & h_{11} & \cdots & h_{1(N-1)} \\ \vdots & \vdots & \ddots & \vdots \\ h_{(N-1)0} & h_{(N-1)1} & \cdots & h_{(N-1)(N-1)} \end{pmatrix} \begin{pmatrix} s_0 \\ s_1 \\ \vdots \\ s_{N-1} \end{pmatrix} + \begin{pmatrix} n_0 \\ n_1 \\ \vdots \\ n_{N-1} \end{pmatrix} \quad (1)$$

Here, $h_{ij}$ represents a propagation channel from a j-th transmitting antenna to an i-th receiving antenna, and $n_i$ represents a noise entering the i-th receiving antenna. To give a vector notation, this is expressed by the Formula (2).

[Mathematical Expression 2]

$$v = Hs + n \quad (2)$$

Here, when multiplying the reception signal v by an inverse matrix of a channel matrix, the transmission signal can be restored.

[Mathematical Expression 3]

$$H^{-1}v = s + H^{-1}n \quad (3)$$

Thus, the MIMO can transmit and receive the plurality of symbols and therefore has a possibility of drastically improving the communication capacity (traffic size). Herein, respective elements of a matrix H needed for demodulation are estimated from reception signals of known patterns (pilot symbols) that are transmitted sequentially from the individual antennas. The signals of the respective antennas can not be separated at a point of estimating the matrix H, and hence the pilot symbols need transmitting by time division.

The MIMO has poor compatibility with the interference between the codes which is caused by the multi-paths etc, and is therefore utilized in combination with the OFDM system capable of avoiding this problem in many cases.

[Patent document 1] Japanese Patent Application Laid-Open Publication No. 2005-110130
[Patent document 2] Japanese Patent Application Laid-Open Publication No. 2004-253925
[Patent document 3] Patent Publication for WO 2005/011167

SUMMARY OF THE INVENTION

Disclosure of the Invention

Problems to be Solved by the Invention

The OFDM has the long symbol length, and hence, when combined with the MIMO, if the pilot symbols (pilot signals) of the respective antennas are transmitted by the time division, a period of pilot signal occupying time increases in proportion to the number of the antennas. FIG. 20 is a diagram showing pilot signal transmission timings when combining the MIMO with the OFDM. When transmitting the OFDM pilot signal from the single antennal, none of the signals can be transmitted from other antennas, so that the transmitting time of the OFDM pilot signals increases in proportion to the number of the antennas. Hence, the data transmission efficiency declines. If a rate of transmitting the pilot signals is reduced, the transmission efficiency can be improved, however, it is difficult to follow a propagation environment that changes fast as in the case of the mobile communications.

Such being the case, the present invention aims at improving the data transmission efficiency by reducing the time needed for transmitting the pilot signals.

Means for Solving the Problems

The present invention adopts the following means in order to solve the problems.

Namely, the present invention is a MIMO-OFDM transmitter comprising a plurality of transmitting antennas transmitting OFDM signals to a receiver, and a generating unit generating direct spreading pilot signals of which pilot data for demodulating the OFDM signals transmitted from the plurality of transmitting antennas in the receiver are spread with direct spreading codes, and transmitting the direct spreading pilot signals from the plurality of transmitting antennas.

Further, in the present invention, MIMO-OFDM transmitter can be configured such that the generating unit generates the direct spreading pilot signals that are spread with the direct spreading codes each different for every transmitting antenna, and transmits the direct spreading pilot signals at the same transmission timing from the plurality of transmitting antennas.

According to the present invention, the transmitting time of the pilot signals can be reduced down to the pilot signal transmitting time for one operation.

Effects of the Invention

According to the present invention, the data transmission efficiency can be improved by reducing the time required for transmitting the pilot signals.

BRIEF DESCRIPTION OF THE DRAWINGS

FIG. 19 is a diagram showing a MIMO architecture.

DETAILED DESCRIPTION OF THE INVENTION

Best Mode of Carrying Out the Invention

An embodiment of the present invention will hereinafter be described with reference to the drawings. Configurations in the following embodiments are exemplifications, and the present invention is not limited to the configurations in the embodiments.

First Embodiment

<System Architecture>

A system, which combines MIMO with OFDM in a first embodiment, is configured by a MIMO-OFDM transmitter having a plurality of transmitting antennas and a MIMO-OFDM receiver having a plurality of receiving antennas as illustrated in FIG. 19 in the prior art.

<<Transmitter>>

Figure 1:
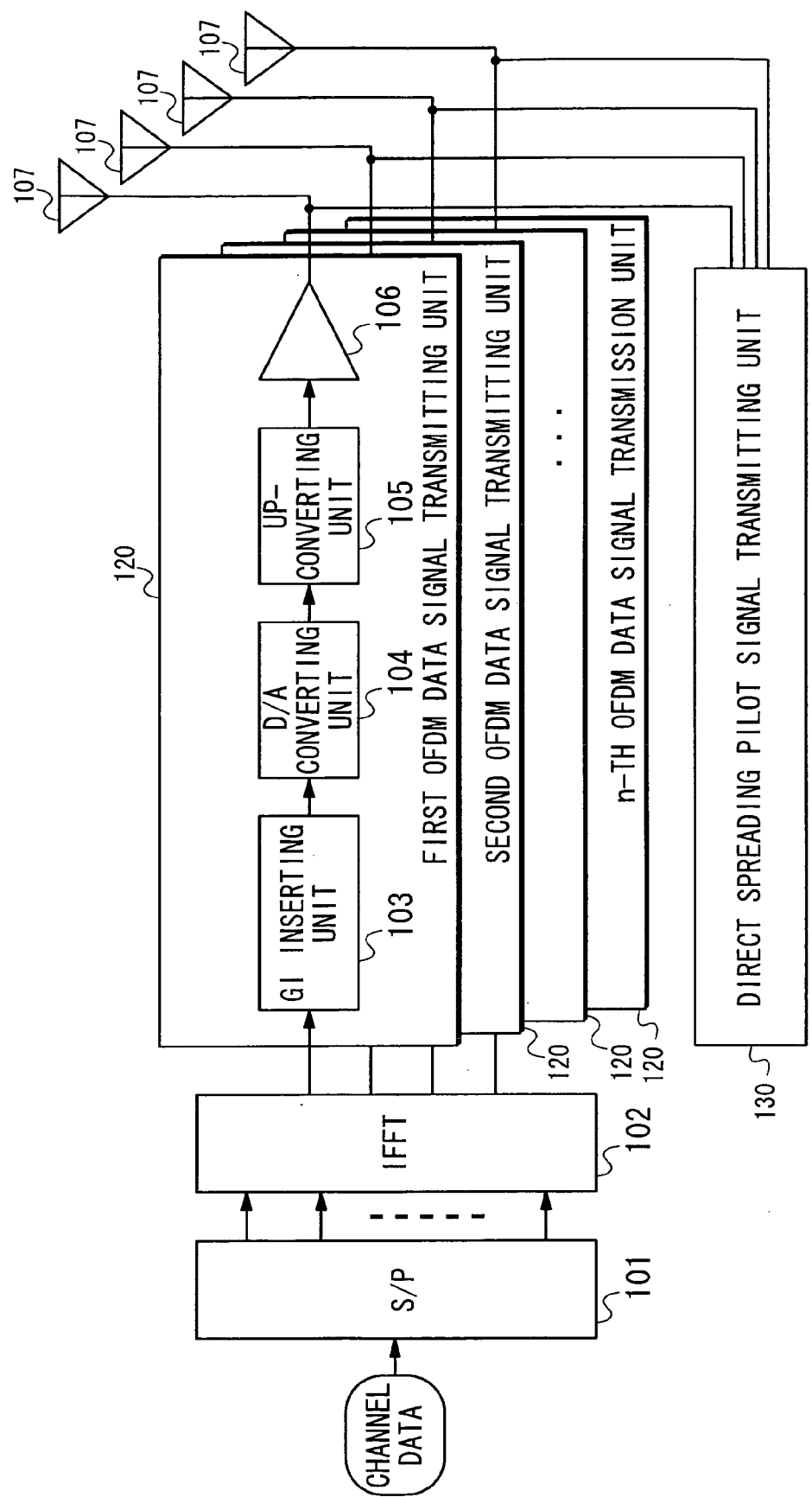
FIG. 1 is a diagram showing an example of a configuration of a MIMO-OFDM transmitter according to an embodiment of the present invention.

FIG. 1 is a diagram showing the MIMO-OFDM transmitter in the first embodiment of the present invention. The MIMO-OFDM transmitter in the first embodiment includes a serial/parallel converting unit 101, an inverse fast Fourier transform operation unit 102, a plurality of OFDM data signal transmitting units 120, a direct spreading pilot signal transmitting unit 130 and a plurality of transmitting antennas 107. The OFDM data signal transmitting units 120 has a guard interval inserting unit 103, a digital/analog converting unit 104, an up-converting unit 105 and an amplifier 106. The direct spreading pilot signal transmitting unit 130 has a direct spreading pilot signal generating unit.

The serial/parallel converting unit 101 converts inputted channel data into a frequency domain data of a subcarrier. The serial/parallel converting unit 101 outputs the frequency domain data to the inverse fast Fourier transform operation unit 102. The inverse fast Fourier transform (IFFT) operation unit 102 inverse-Fourier-transforms the inputted frequency domain data into time domain data. The inverse fast Fourier transform operation unit 102 outputs the time domain data to the OFDM data signal transmitting unit 120 for every transmitting antenna.

The time domain data inputted to the OFDM data signal transmitting unit 120 per transmitting antenna is inputted to the guard interval inserting unit 103. The guard interval inserting unit 103 attaches (inserts), as a guard interval, part of data of the trailing portion of the time domain to the head (of a symbol). The data attached with the guard interval is defined as an OFDM symbol. The insertion of the guard interval (guard period) can reduce influence of interference, caused by multi-paths, between the OFDM symbols. The guard interval inserting unit 103 outputs the OFDM symbol to the digital/analog converting unit 104. The digital/analog converting unit 104 converts the OFDM symbol inputted from the guard interval inserting unit 103 into analog signals, and outputs the analog signals to the up-converting unit 105. The up-converting unit 105 up-converts the inputted analog signals into high-frequency signals. The amplifier 106 amplifies the high-frequency signals and transmits the amplified signals from the respective antennas 107.

In the direct spreading pilot signal transmitting unit 130, the direct spreading pilot signal generating unit generates direct spreading pilot signals (DS-Pilot), and these pilot signals are transmitted from the respective transmitting antennas.

Figure 2:
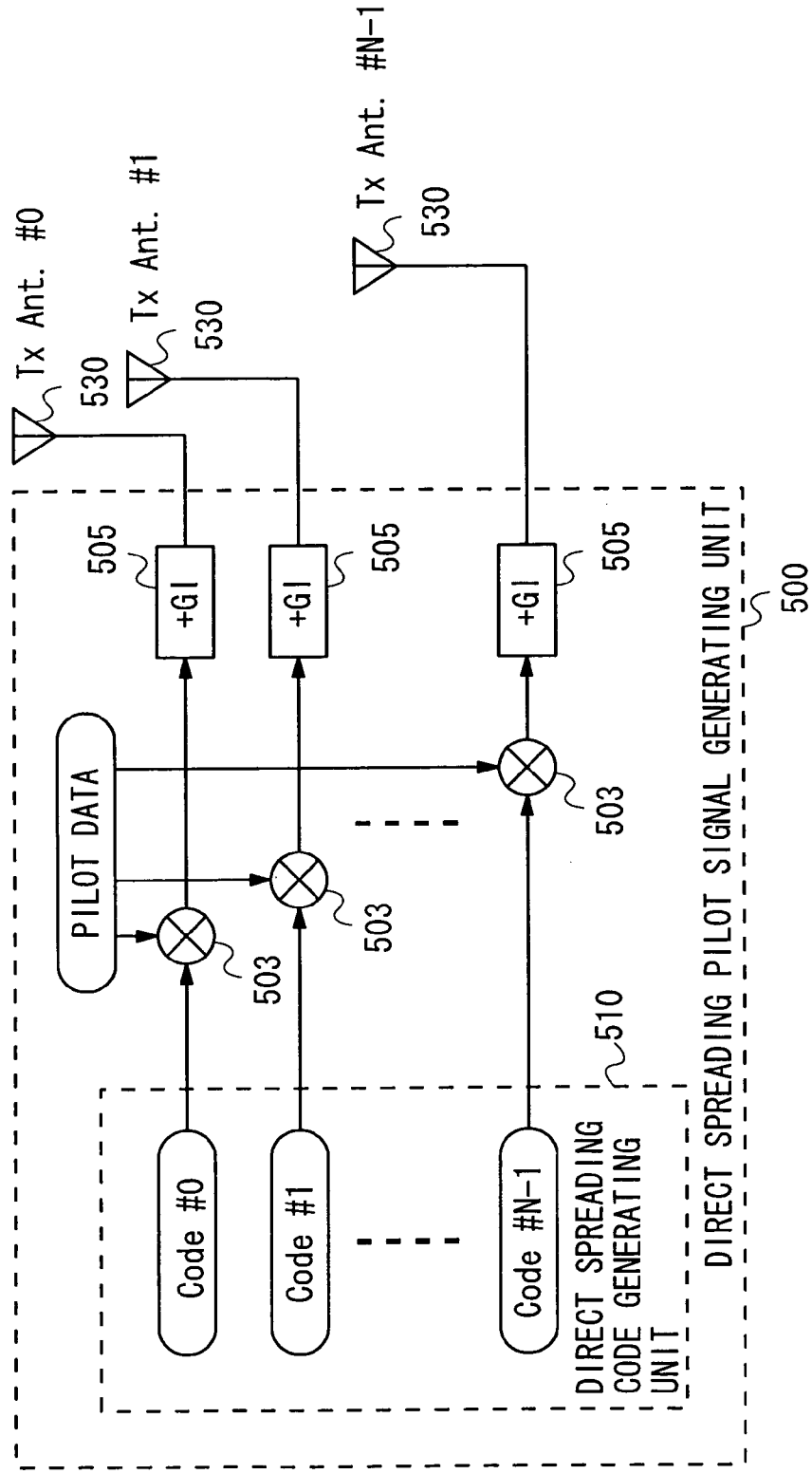
FIG. 2 is a diagram showing an example of a configuration for transmitting direct spreading pilot signals based on different codes via respective antennas.

FIG. 2 is a diagram showing the direct spreading pilot signal generating unit 500 in the direct spreading pilot signal transmitting unit 130 on the transmitting side. The MIMO-OFDM transmitter in the first embodiment further includes the direct spreading pilot signal generating unit 500.

The direct spreading pilot signal generating unit 500 includes a direct spreading code generating unit 510, a multiplying unit 503 that multiplies, by pilot data, the direct spreading code generated by the direct spreading code generating unit 510, and a guard interval inserting unit 505. The direct spreading pilot signals generated by the direct spreading pilot signal generating unit 500 are transmitted from individual transmitting antennas 530.

The direct spreading code generating unit 510 generates individual direct spreading codes (Code #0 through Code #N−1) for every transmitting antenna. The multiplying unit 503 multiplies, by the pilot data (the known signal), the direct spreading code per transmitting antenna, which has been generated by the direct spreading code generating unit 510, and outputs a result thereof to the guard interval inserting unit 505. The pilot data can involve using data different for every transmitting antenna and also data that is the same with all of the transmitting antennas. The guard interval inserting unit 505 attaches (inserts), as the guard interval, part of the tailing portion of the inputted signal to the signal (symbol), thereby organizing the direct spreading pilot signal (pilot symbol). Further, a scheme of attaching none of the guard interval is also available.

The direct spreading pilot signals generated by the direct spreading pilot signal generating unit 500 are transmitted simultaneously from the respective transmitting antennas 530.

Figure 3:
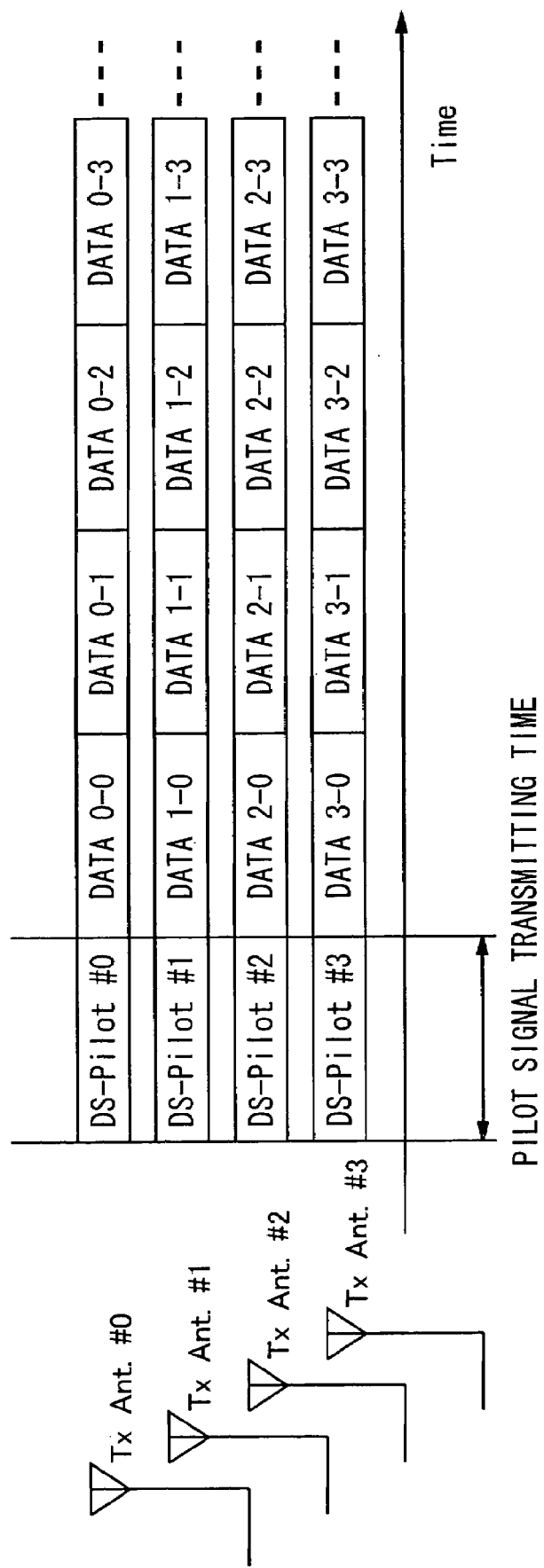
FIG. 3 is a diagram showing pilot signal transmission timings when using the direct spreading pilot signals.

FIG. 3 is a diagram showing a transmission timing of the pilot signals in the first embodiment. Each transmitting antenna is capable of reducing a period of transmitting time of the pilot signals in order to transmit the direct spreading pilot signals simultaneously.

<<Receiver>>

Figure 4:
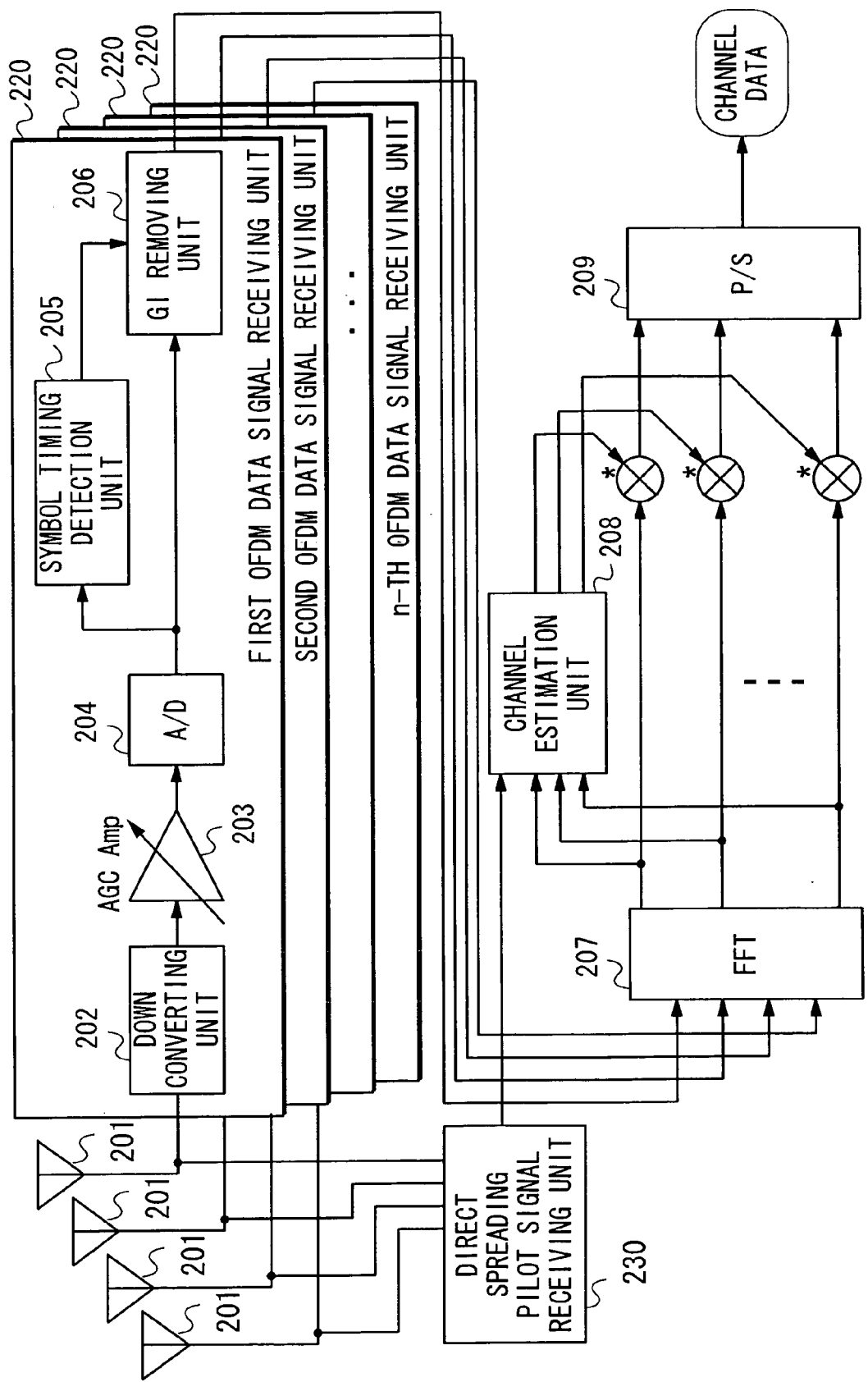
FIG. 4 is a diagram showing an example of a configuration of a MIMO-OFDM receiver according to the embodiment of the present invention.

FIG. 4 is a diagram illustrating the MIMO-OFDM receiver in the first embodiment of the present invention. The MIMO-OFDM receiver in the first embodiment includes a plurality of receiving antennas 201, OFDM data signal receiving units 220, a fast Fourier transform operation unit 207, a channel estimation unit 208 and a parallel/serial converting unit 209.

The data signals received by the respective receiving antennas 201 are inputted to the OFDM data signal receiving units 220 corresponding to the individual receiving antennas 201. The data signals inputted to the OFDM data signal receiving units 220 are inputted to a down-converting unit 202. The down-converting unit 202 down-converts the high-frequency signals transmitted from the transmitter and received by the receiving antennas 201. An AGC (Auto Gain Control) amplifier 203 amplifies the down-converted reception signals. An analog/digital converting unit 204 converts the amplified reception signals into digital signals. A symbol timing detection unit 205 detects the timing of the OFDM symbol from the guard interval (GI). A guard interval removing unit 206 removes the guard intervals inserted by the transmitter from the digital signals. The data signals, of which the guard intervals have been removed, are inputted to the fast Fourier transform operation unit 207.

The fast Fourier transform (FFT) operation unit 207 transforms the digital signals in the time domain into a plurality of subcarrier signals in the frequency domain. The channel estimation unit 208 makes channel estimation per subcarrier by use of the data outputted from a direct spreading pilot signal receiving unit 230. A channel estimation value obtained by the channel estimation unit 208 is multiplied by the output of the fast Fourier transform operation unit 207, thereby correcting a channel fluctuation. The parallel/serial converting unit 209 converts the corrected parallel data into the serial data, thereby obtaining the serial channel data.

Figure 5:
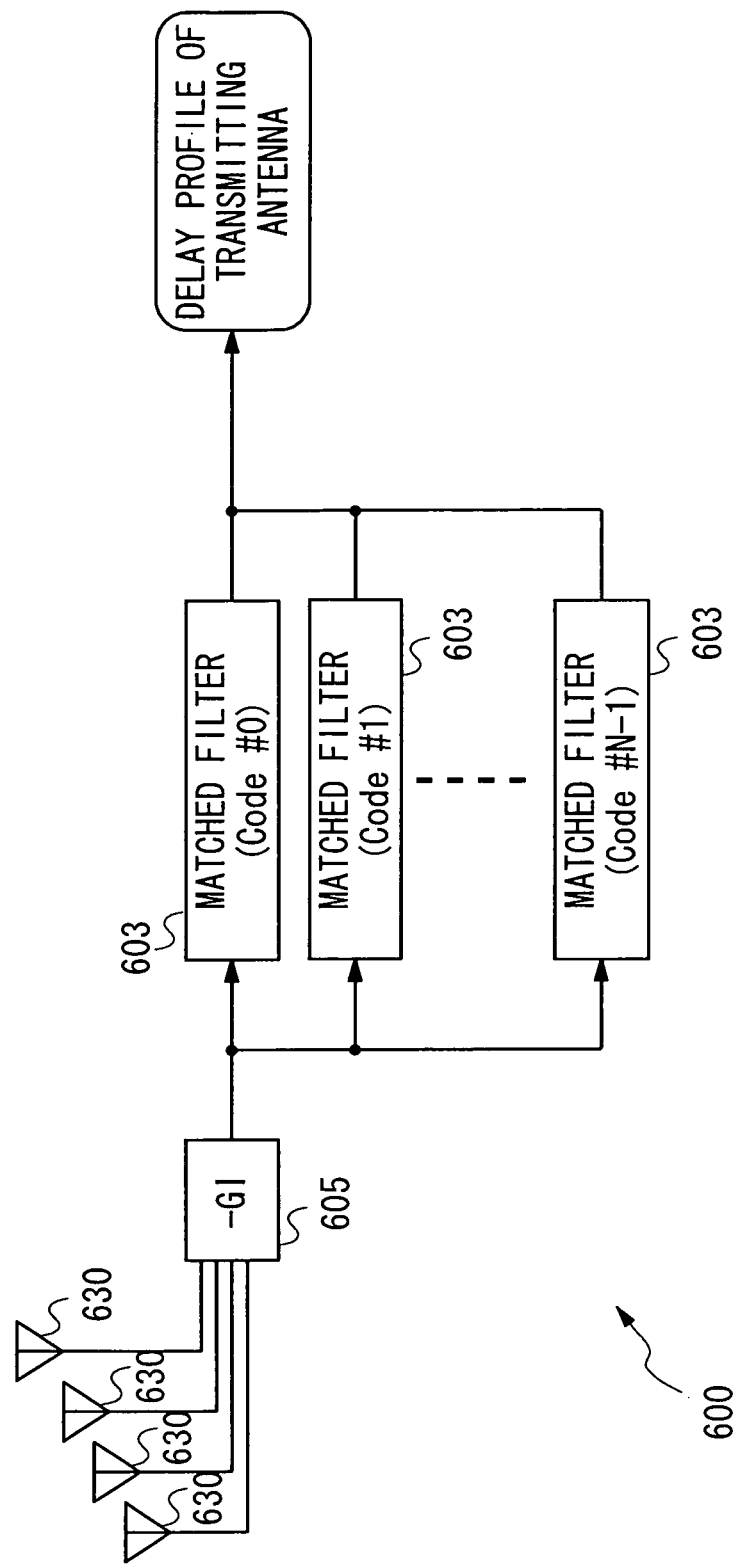
FIG. 5 is a diagram showing an example of a configuration for receiving the direct spreading pilot signals based on the different codes from the respective antennas.

FIG. 5 is a diagram illustrating an example of a configuration for receiving the direct spreading pilot signals based on the separate direct spreading codes given from the respective antennas The MIMO-OFDM receiver in the first embodiment further includes a direct spreading pilot signal receiving unit 600.

The direct spreading pilot signal receiving unit 600 has a guard interval removing unit 605 and a plurality of matched filters 603 corresponding to the direct spreading codes of the respective transmitting antennas.

The guard interval removing unit 605 removes the guard intervals from the signals received by the receiving antennas 630, and outputs the signals to the matched filters 603. The plurality of matched filters 603 wait for the signals with the direct spreading codes corresponding to the respective transmitting antennas. When the reception signals are inputted to these matched filters 603, a delay profile of each transmitting antenna is obtained by a despreading process based on a replica of the spreading code. This delay profile is outputted to the channel estimation unit 208. A channel estimation value of each transmitting antenna can be calculated from the delay profile of each transmitting antenna.

Operation and Effect in First Embodiment

According to the first embodiment discussed so far, in the direct spreading pilot signal generating unit 500, the direct spreading code generating unit 510 generates the direct spreading code per transmitting antenna. The direct spreading pilot signals generated from the direct spreading codes are transmitted simultaneously from the respective transmitting antennas.

Figure 20:
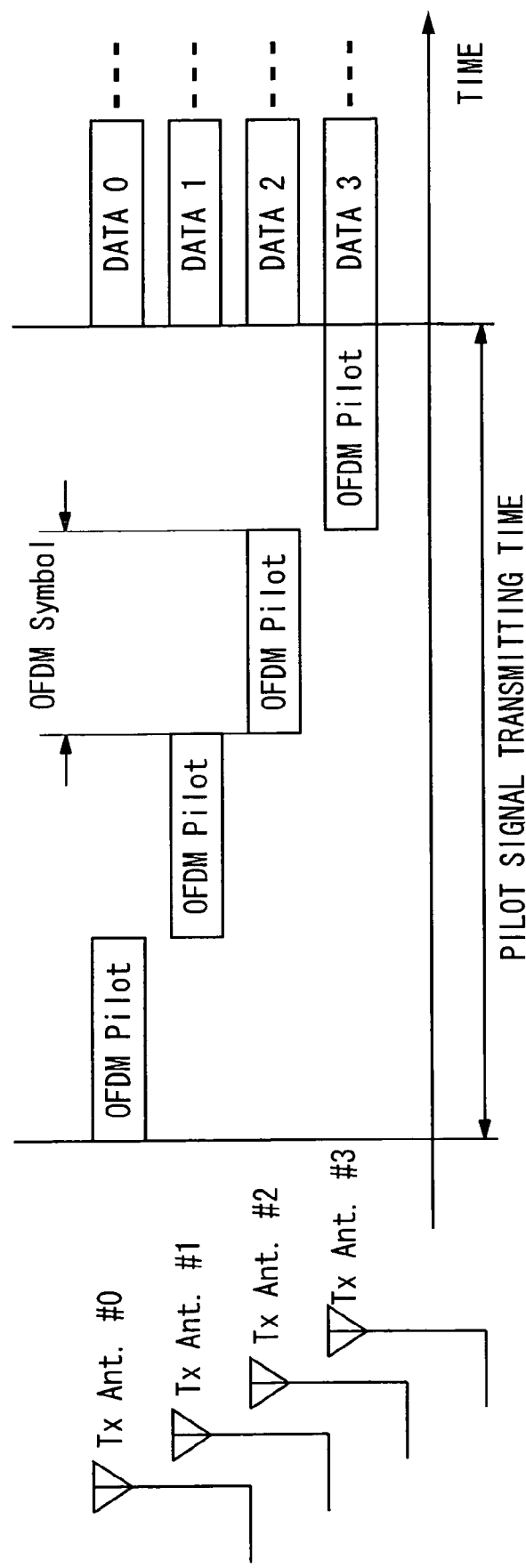
FIG. 20 is a diagram showing the transmission timings of the pilot signals when combining MIMO and OFDM with each other.

In the direct spreading pilot signal receiving unit 600, the matched filters 603 wait for the signals with the direct spreading codes generated per transmitting antenna by the direct spreading code generating unit 510. When the reception signals are inputted to the matched filters 603, the delay profiles for calculating the channel estimation values are obtained from the pilot signals.

according to the first embodiment, the pilot signals for every transmitting antenna can be organized in a state causing no interference between the pilot signals by spreading the pilot data with the direct spreading codes. This scheme enables the pilot signals (FIG. 20) per transmitting antenna, which have hitherto been transmitted by the time division, to be transmitted toward the receiver at the same transmission timing (FIG. 3). This operation makes it possible to reduce the transmitting time of the pilot signals, which have hitherto increased in proportion to the number of antennas, down to the pilot signal transmitting time for one operation.

Namely, according to the first embodiment, the pilot signal involves using the direct spreading pilot signal used for the CDMA method. To be specific, the direct spreading pilot signals using the individual direct spreading codes are transmitted from the respective antennas, thereby enabling the simultaneous transmissions of the pilot signals from the respective transmitting antennas, with the result that the pilot signal transmitting time can be reduced to a great degree.

Second Embodiment

<System Architecture>

Next, a second embodiment of the present invention will be described. The second embodiment has the same configuration as of the first embodiment, and hence the description thereof will be focused mainly on a different point, while the explanations of the common points are omitted.

<<Transmitter>>

Figure 6:
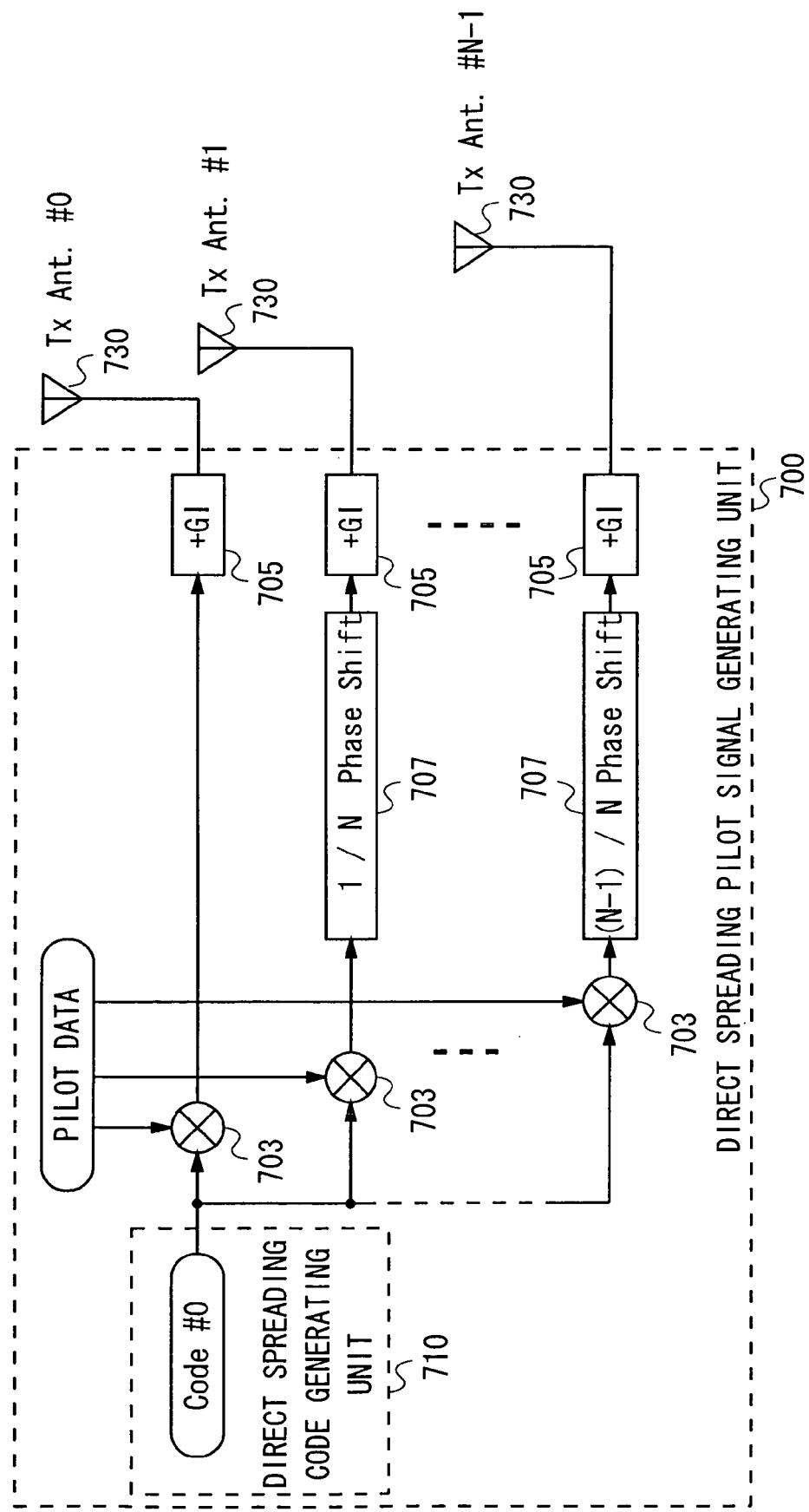
FIG. 6 is a diagram showing an example of a configuration for transmitting the direct spreading pilot signals each having a different shift quantity from the respective antennas.

FIG. 6 is a diagram showing a direct spreading pilot signal generating unit 700. The OFDM transmitter in the second embodiment has the same configuration of the MIMO-OFDM transmitter in the first embodiment except a point that the direct spreading pilot signal generating unit has a different configuration.

The direct spreading pilot signal generating unit 700 includes a direct spreading code generating unit 710, a multiplying unit 703 that multiplies, by the pilot data, the direct spreading code generated by the direct spreading code generating unit 710, a phase shifting unit 707 and a guard interval inserting unit 705. The direct spreading pilot signals generated by the direct spreading pilot signal generating unit 700 are transmitted from respective transmitting antennas 730.

The direct spreading code generating unit 710 generates only one direct spreading code (Code #0) for all of the transmitting antennas. The multiplying unit 703 multiplies, by the pilot data (the known signal), the direct spreading code generated by the direct spreading code generating unit 710.

Figure 7:
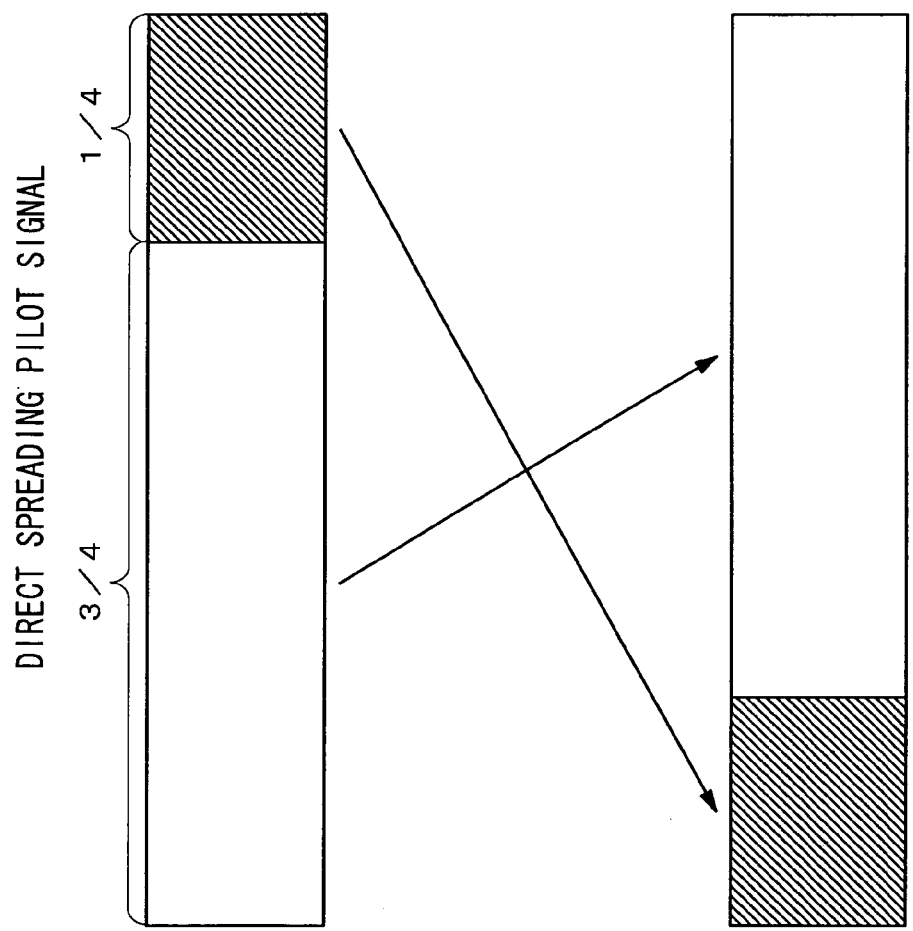
FIG. 7 is a diagram showing an example of a ¼ phase-shift of the direct spreading pilot signal.

The phase shifting unit 707 shifts a phase of the multiplied signal by n/N, and outputs the phase-shifted signal to the guard interval inserting unit 705. Herein, "n" represents a serial number of the transmitting antenna, and "N" represents a total number of the transmitting antennas. The phase shift is a process of replacing, in the case of shifting, e.g., a ¼ phase, a ¼ tailing portion of the signal and a ¾ leading portion of the signal with each other. FIG. 7 is a diagram showing an example of how the signal is shifted by the ¼ phase. One of the signals multiplied by the multiplying unit 703 is inputted, without being phase-shifted, to the guard interval inserting unit 705.

The guard interval inserting unit 705 attaches (inserts), as the guard interval, part of the tailing portion of the inputted signal, thereby organizing the direct spreading pilot signal. Further, a scheme of attaching none of the guard interval is also available.

The direct spreading pilot signals generated by the direct spreading pilot signal generating unit 700 are transmitted simultaneously from the respective transmitting antennas 730.

The transmission timing of the pilot signal in the second embodiment is the same of the transmission timing of the pilot signal in the first embodiment (FIG. 3). The respective transmitting antennas are capable of reducing the transmitting time of the pilot signals because of simultaneously transmitting the direct spreading pilot signals.

<<Receiver>>

Figure 8:
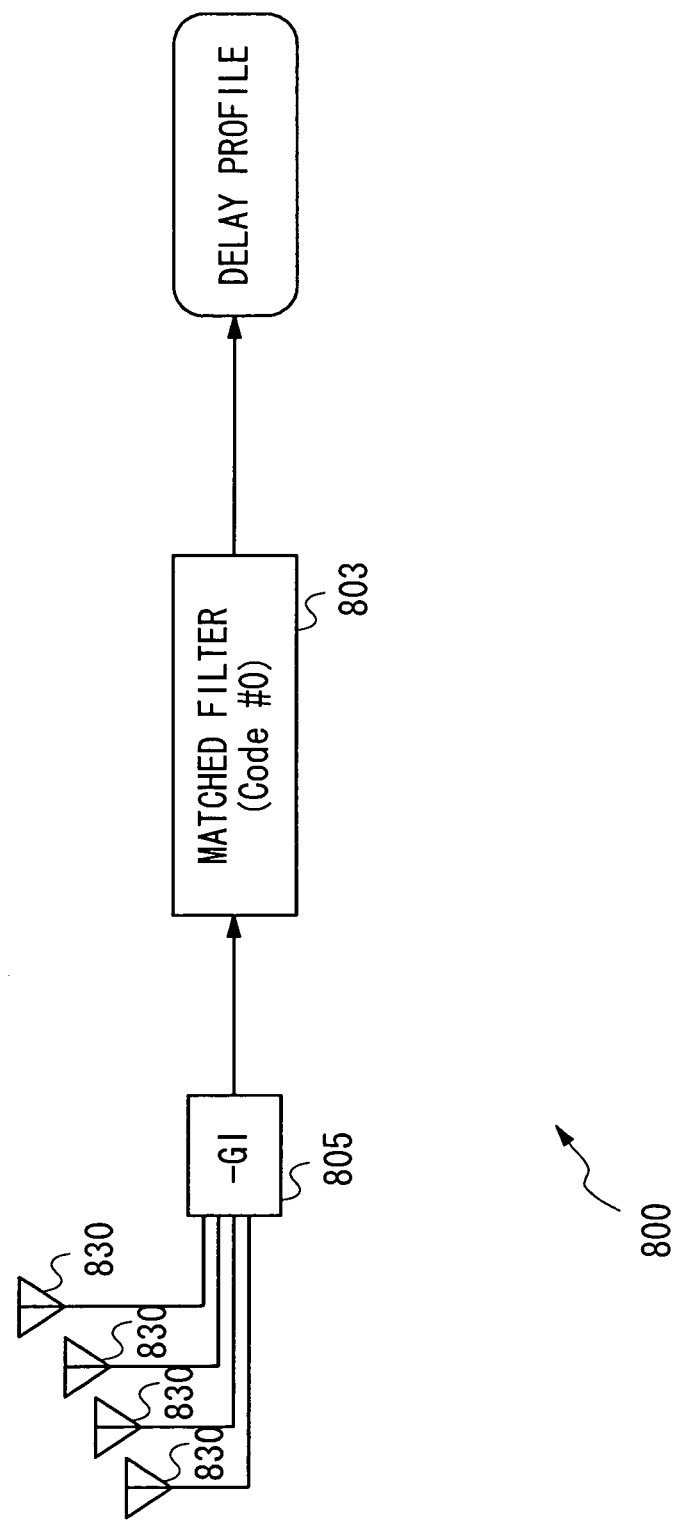
FIG. 8 is a diagram showing an example of a configuration for receiving the direct spreading pilot signals each having the different shift quantity from the respective antennas.

FIG. 8 is a diagram showing an example of a configuration for receiving the direct spreading pilot signals based on the same direct spreading code from the respective antennas. The MIMO-OFDM receiver in the second embodiment has the same configuration as of the OFDM receiver in the first embodiment except a point that the direct spreading pilot signal receiving unit has a different configuration.

A direct spreading pilot signal receiving unit 800 includes a guard interval removing unit 805 and a matched filter 803 corresponding to the direct spreading code.

The guard interval removing unit 805 removes the guard intervals from the signals received by receiving antennas 830, and outputs the GI-removed signals to the matched filter 803. The matched filter 803 waits for the signals with the direct spreading code generated by the direct spreading code generating unit 710. When the reception signals are inputted to the matched filter 803, the delay profile of each transmitting antenna is acquired. All of the transmitters employ the single direct spreading code, and the delay profiles of all of the transmitters are acquired with the output of the single matched filter.

Figure 9:
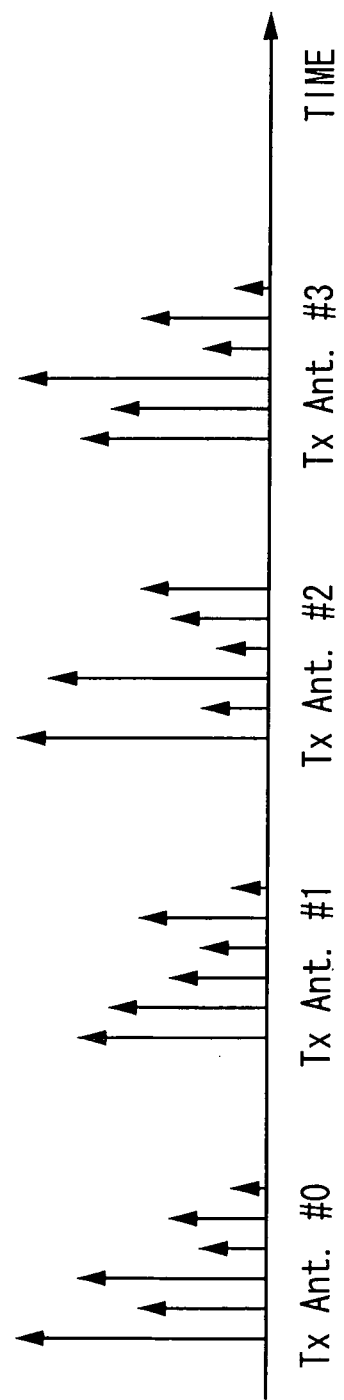
FIG. 9 is a diagram showing an example of an output of a matched filter on the receiving side when four pieces of transmitting antennas are provided.

FIG. 9 is a diagram showing the delay profile obtained by the matched filter. Generally, a width of the delay profile is well small as compared with a length of the OFDM symbol, and hence, as illustrated in FIG. 9, the delay profiles of the transmitting antennas are acquired in the form of being spaced in time from each other. The delay profiles of the individual transmitting antennas can be easily separated according to every transmitting antenna. The channel estimation values of the transmitting antennas can be calculated by use of the delay profiles of these individual transmitting antennas.

Operation and Effect in Second Embodiment

According to the second embodiment discussed so far, in the direct spreading pilot signal generating unit 700, the direct spreading code generating unit 710 generates the direct spreading code. Generated also is the direct spreading pilot signal given the phase shift of which quantity is different for every transmitting antenna. This direct spreading pilot signal is transmitted from each transmitting antenna.

In the direct spreading pilot signal receiving unit 800, the matched filter 803 waits for the signals with the direct spreading code generated by the direct spreading code generating unit 710. When the reception signals are inputted to the matched filter 803, the delay profiles of all of the transmitting antennas are obtained.

According to the second embodiment, the transmitting time of the pilot signals can be reduced. Further, only one matched filter may be sufficient by utilizing the same direct spreading code for all of the transmitting antennas, and hence the device can be simplified.

Third Embodiment

<System Architecture>

Next, a third embodiment of the present invention will be described. The third embodiment has the same configuration as of the first embodiment, and hence the description thereof will be focused mainly on a different point, while the explanations of the common points are omitted.

<<Transmitter>>

Figure 10:
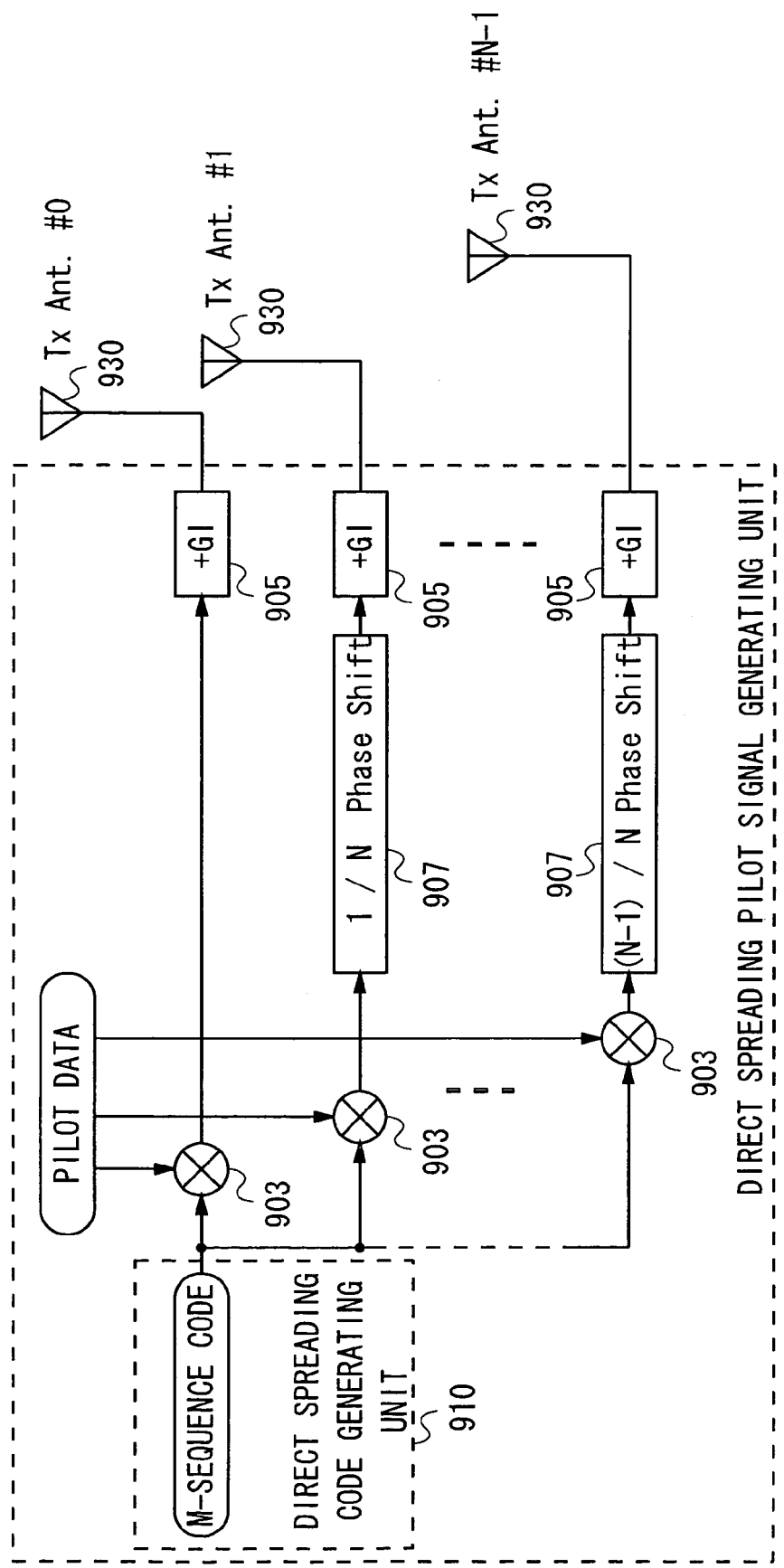
FIG. 10 is a diagram illustrating an example of a configuration for transmitting the direct spreading pilot signals using an M-sequence code.

FIG. 10 is a diagram showing a direct spreading pilot signal generating unit 900. The OFDM transmitter in the third embodiment has the same configuration of the MIMO-OFDM transmitter in the first embodiment except a point that the direct spreading pilot signal generating unit has a different configuration. The direct spreading pilot signal generating unit 900 includes a direct spreading code generating unit 910, a multiplying unit 903 that multiplies, by the pilot data, the direct spreading code generated by the direct spreading code generating unit 910, a phase shifting unit 907 and a guard interval inserting unit 905. The direct spreading pilot signals generated by the direct spreading pilot signal generating unit 900 are transmitted from respective transmitting antennas 930.

Figure 12:
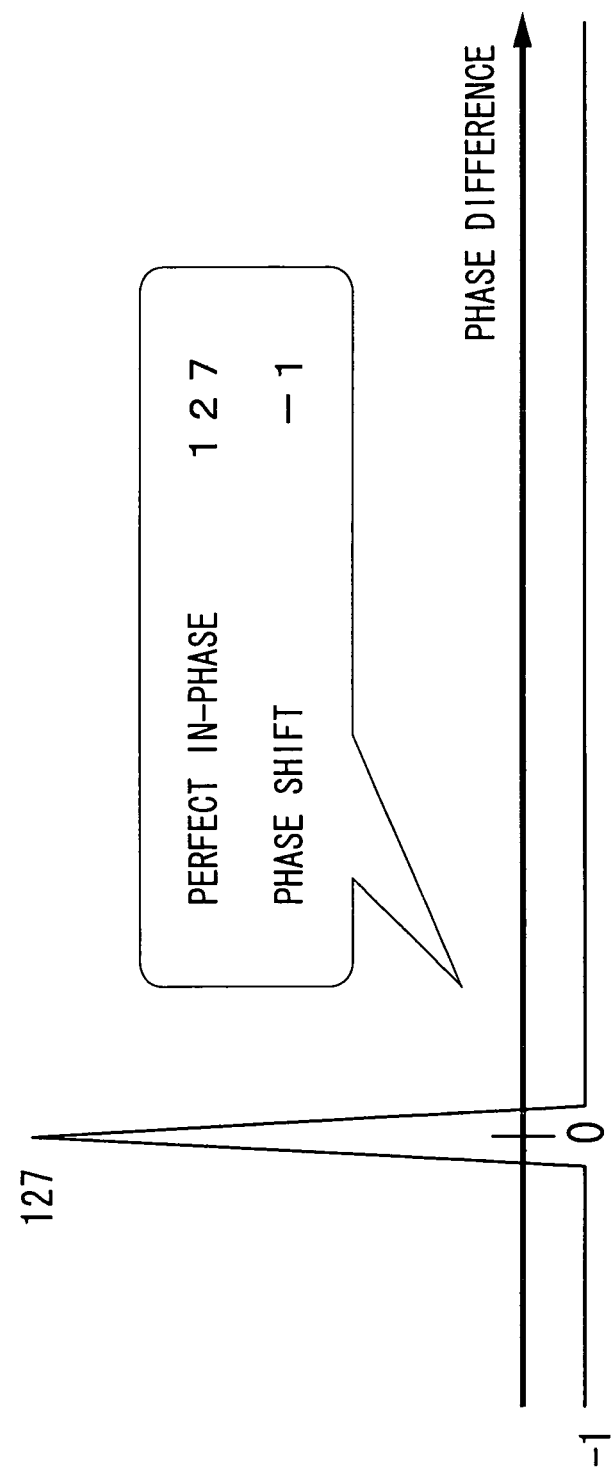
FIG. 12 is a graph showing an autocorrelation characteristic of the M-sequence code having a code length 127.

The direct spreading code generating unit 910 generates only one direct spreading code for all of the transmitting antennas. Herein, the direct spreading code involves using a code such as an M-sequence (maximum length sequence) code exhibiting a good autocorrelation (the M-sequence code is applied in the third embodiment). FIG. 12 is a diagram showing a characteristic of the autocorrelation of the M-sequence code having a code length 127. In the case of taking the autocorrelation of the code length 127, the code length comes to 127 when perfectly in phase and becomes −1 when the phase is shifted.

The phase shifting unit 907 shifts a phase of the multiplied signal by n/N, and outputs the phase-shifted signal to the guard interval inserting unit 905. Herein, "n" represents a serial number of the transmitting antenna, and "N" represents a total number of the transmitting antennas. The phase shift is the same process as in the second embodiment. One of the signals multiplied by the multiplying unit 903 is inputted, without being phase-shifted, to the guard interval inserting unit 905.

The guard interval inserting unit 905 attaches (inserts), as the guard interval, part of the tailing portion of the inputted signal, thereby organizing the direct spreading pilot signal. Further, the scheme of attaching none of the guard interval is also available.

The direct spreading pilot signals generated by the direct spreading pilot signal generating unit 900 are transmitted simultaneously from the respective transmitting antennas 930.

The transmission timing of the pilot signal in the third embodiment is the same of the transmission timing of the pilot signal in the first embodiment. The respective transmitting antennas are capable of reducing the transmitting time of the pilot signals because of simultaneously transmitting the direct spreading pilot signals.

<<Receiver>>

Figure 11:
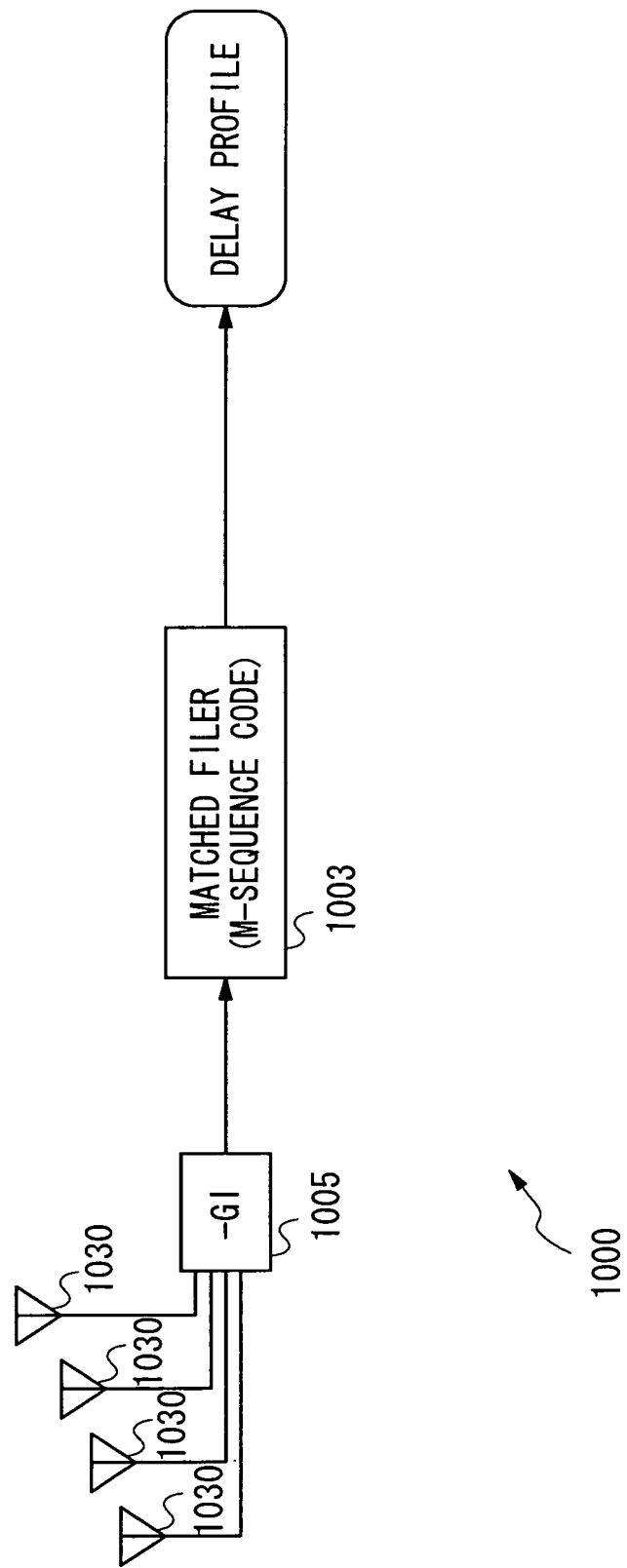
FIG. 11 is a diagram illustrating an example of a configuration for receiving the direct spreading pilot signals based on the same direct spreading code (M-sequence code) from the respective antennas.

FIG. 11 is a diagram showing an example of a configuration for receiving the direct spreading pilot signals based on the same direct spreading code from the respective antennas. The MIMO-OFDM receiver in the third embodiment has the same configuration as of the OFDM receiver in the first embodiment except a point that the direct spreading pilot signal receiving unit has a different configuration.

A direct spreading pilot signal receiving unit 1000 includes a guard interval removing unit 1005 and a matched filter 1003 corresponding to the direct spreading code (M-sequence code).

The guard interval removing unit 1005 removes the guard intervals from the signals received by receiving antennas 1030, and outputs the GI-removed signals to the matched filter 1003. The matched filter 1003 waits for the signals with the direct spreading code (M-sequence code) generated by the direct spreading code generating unit 910. When the reception signals are inputted to the matched filter 1003, the delay profile of each transmitting antenna is acquired. All of the transmitters employ the single direct spreading code (M-sequence code), and the delay profiles of all of the transmitters are acquired with the output of the single matched filter.

The delay profile obtained by the matched filter 1003 is the same as the delay profile (FIG. 9) obtained by the matched filter 803 in the second embodiment. The channel estimation value of each transmitting antenna can be calculated from the delay profile of each transmitting antenna.

Operation and Effect in Third Embodiment

According to the embodiment discussed so far, in the direct spreading pilot signal generating unit 900, the direct spreading code generating unit 910 generates the direct spreading code (M-sequence code). Generated also is the direct spreading pilot signal that is phase-shifted with a quantity different for every transmitting antenna. The direct spreading pilot signals are transmitted simultaneously from the respective transmitting antennas.

In the direct spreading pilot signal receiving unit 1000, the matched filter 1003 waits for the signals with the direct spreading code (M-sequence code) generated by the direct spreading code generating unit 910. When the reception signals are inputted to the matched filter 1003, the delay profiles of all of the transmitting antennas are obtained.

According to the third embodiment, the transmitting time of the pilot signals can be reduced. Moreover, all of the transmitting antennas use the same direct spreading code, and hence only one matched filter may be sufficient, whereby the device can be simplified. Further, the M-sequence code has the preferable autocorrelation characteristic, thereby restraining the interference between the signals and improving accuracy of the delay profile obtained by the matched filter 1003.

Fourth Embodiment

<System Architecture>

Next, a fourth embodiment of the present invention will be described. The fourth embodiment has the same configuration as of the first embodiment, and therefore the description thereof will be focused mainly on a different point, while the explanations of the common points are omitted.

<<Transmitter>>

The transmitter in the fourth embodiment further has the same configuration as of the MIMO-OFDM transmitter in the first embodiment. The pilot data to be used, however, involve employing the data shorter than a length of the OFDM symbol.

Figure 13:
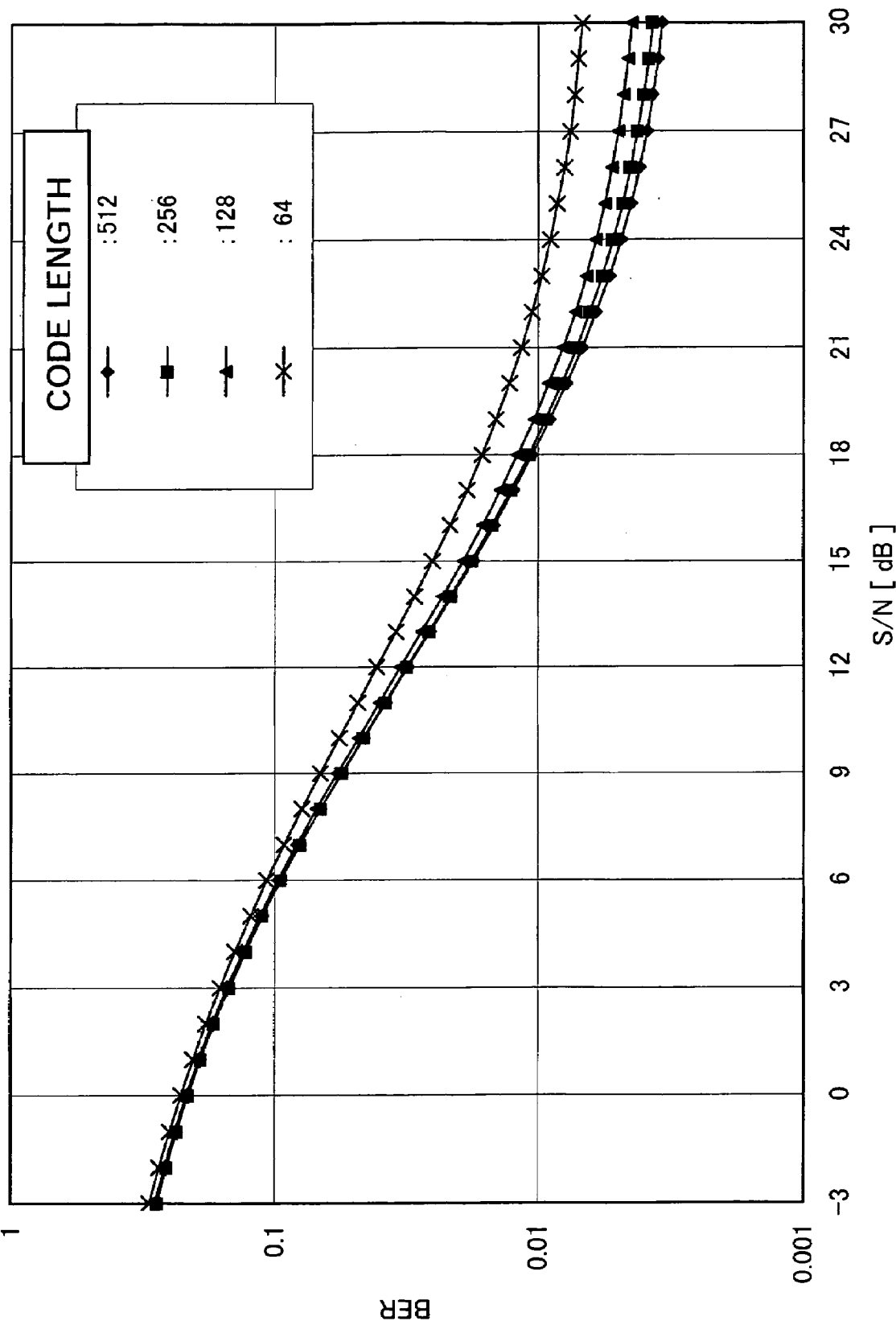
FIG. 13 is a graph showing a BER characteristic when using short direct spreading pilot signals.

FIG. 13 is a graph showing a BER (Bit Error Rate) characteristic when decreasing a length of the direct spreading pilot signal to be used. FIG. 13 shows the BER characteristic when employing the direct spreading pilot signals having a code length 512, a code length 256, a code length 128 and a code length 64 with respect to an OFDM symbol length 512. At an operating point given by BER=0.1, for instance, even when shortened to, e.g., the length 128 corresponding to ¼ of the OFDM symbol length, it is understood that there is almost no change when the code length is 512. Namely, it is possible to restrain a decline of the BER characteristic even by using the short direct spreading pilot signal generated by employing the short pilot data.

Figure 14:
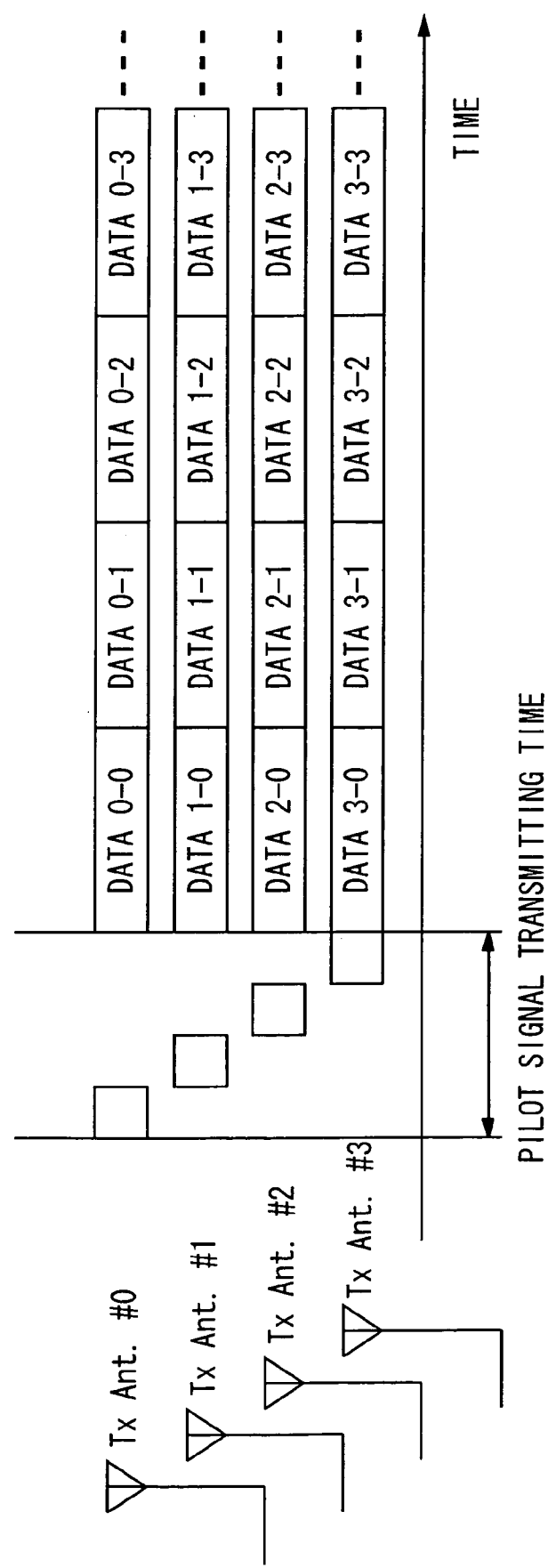
FIG. 14 is a diagram showing transmission timings when employing the short direct spreading pilot signals.

FIG. 14 is a diagram showing the transmission timing when using the short direct spreading pilot signals. The short direct spreading pilot signals are transmitted by the time division, whereby the transmitting time of the pilot signals can be reduced.

Further, when, e.g., four pieces of transmitting antennas are provided, the length of the signal direct spreading pilot signal is set to ¼ of the OFDM symbol length. At this time, the total time for transmitting the direct spreading pilot signals from all of the transmitting antennas is equalized to the OFDM symbol length. This contrivance enables the data transmission timings delimited at the same interval.

Figure 15:
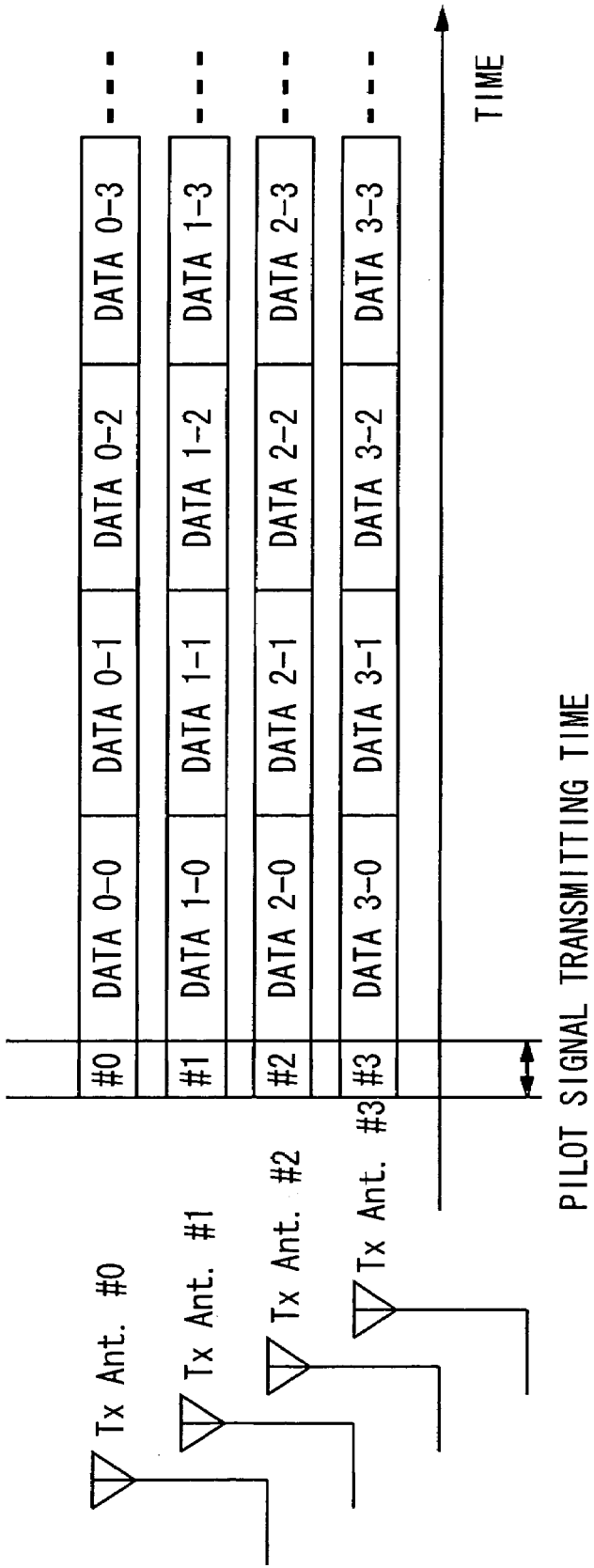
FIG. 15 is a diagram showing transmission timings when multiplexing the short direct spreading pilot signals.
Figure 16:
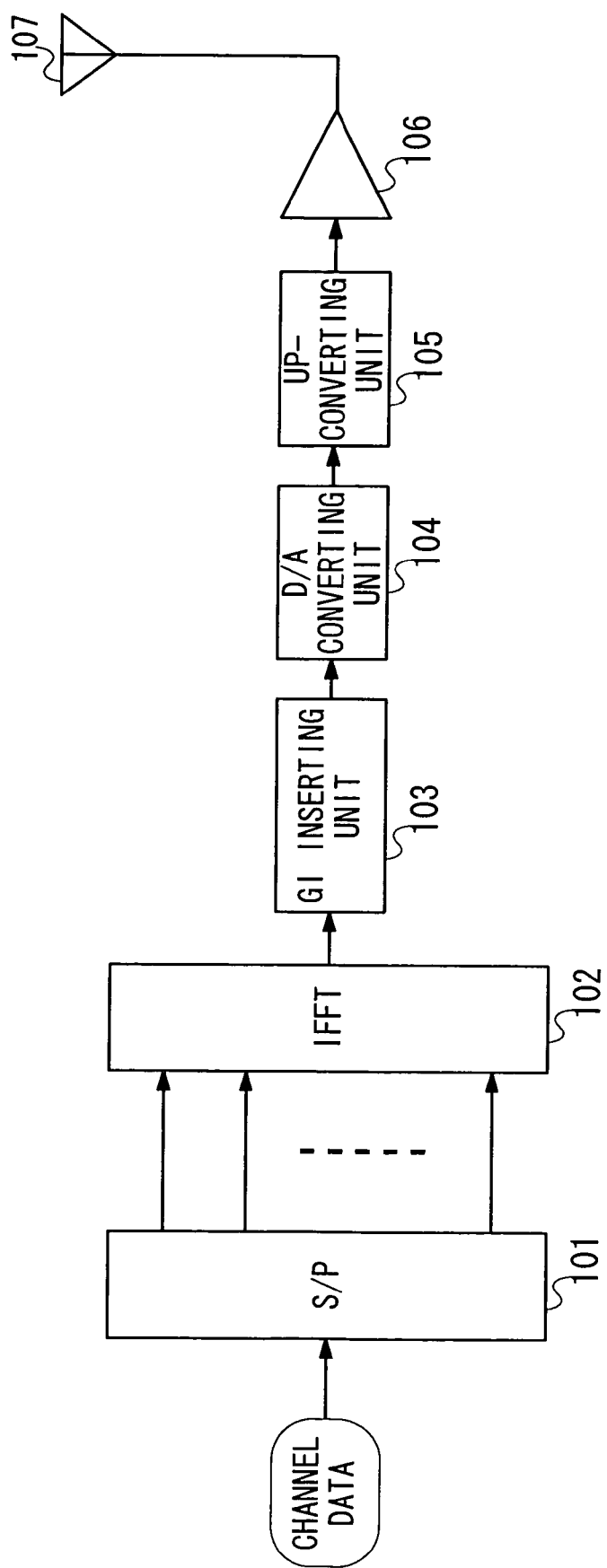
FIG. 16 is a diagram showing an example of a configuration of an OFDM transmitter in an OFDM transmission system.
Figure 17:
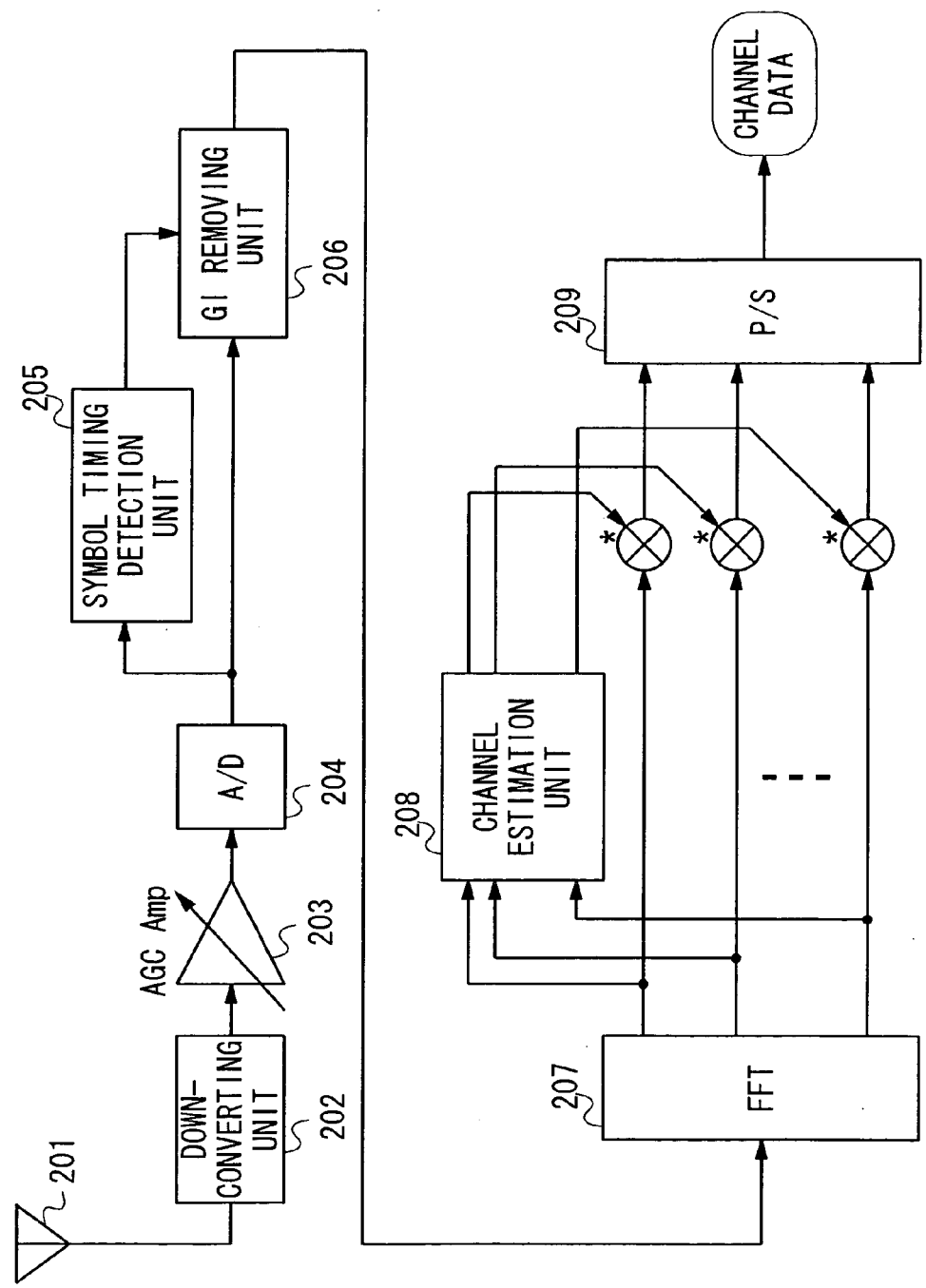
FIG. 17 is a diagram showing an example of a configuration of an OFDM receiver in the OFDM transmission system.
Figure 18:
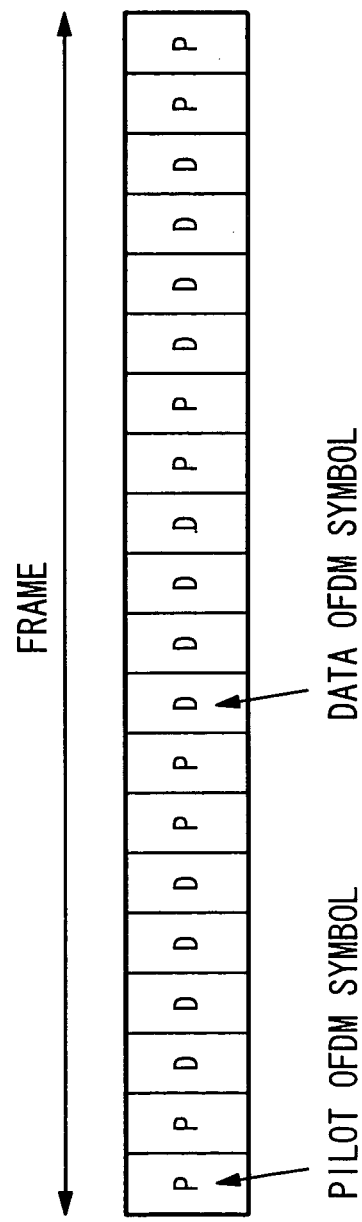
FIG. 18 is a diagram showing an example of a frame structure.

Moreover, as in the first embodiment, the short direct spreading pilot signals are transmitted simultaneously from the respective transmitting antennas, thereby making it possible to further decrease the transmitting time of the pilot signals. FIG. 15 is a diagram showing the transmission timings when the short direct spreading pilot signals are transmitted simultaneously from the respective transmitting antennas.

<<Receiver>>

The receiver in the fourth embodiment can have the same configuration as of the MIMO-OFDM receiver in the first embodiment.

Operation and Effect in Fourth Embodiment

According to the fourth embodiment discussed so far, the OFDM transmitter generates the direct spreading pilot signal shorter than the OFDM symbol length.

With this operation, the transmitting time of the pilot signals can be reduced.

Moreover, the OFDM transmitter takes the same configuration as in the first embodiment and is thereby capable of transmitting the direct spreading pilot signals each shorter than the OFDM symbol length simultaneously from the respective transmitting antennas.

According to the fourth embodiment, the transmitting time of the pilot signals can be further reduced.

INCORPORATION BY REFERENCE

The disclosures of Japanese patent application No. JP2006-126537 filed on Apr. 28, 2006 including the specification, drawings and abstract are incorporated herein by reference.

What is claimed is:

1. A MIMO-OFDM transmitter comprising:
   a plurality of transmitting antennas that transmit OFDM signals to a receiver; and
   a signal generator that generates direct spreading pilot signals of which pilot data for demodulating the OFDM signals transmitted from the plurality of transmitting antennas in the receiver are spread with direct spreading codes, and transmits the direct spreading pilot signals from the plurality of transmitting antennas,
   wherein each of the direct spreading codes is the same direct spreading code, the signal generator gives a predetermined phase shift per transmitting antenna to the pilot data that are spread with the same direct spreading code, and thereafter transmits the pilot signals from the plurality of transmitting antennas, and
   the signal generator attaches guard intervals to within the direct spreading pilot signals in a time domain.

2. The MIMO-OFDM transmitter according to claim 1, wherein the same direct spreading code is an M-sequence (maximum length sequence) code.

3. A method of transmission of pilot signals by a MIMO-OFDM transmitter which transmits OFDM signals to a receiver using a plurality of transmitting antennas, the transmission method comprising:
   generating direct spreading pilot signals of which pilot data for demodulating the OFDM signals transmitted from the plurality of transmitting antennas in the receiver are spread with direct spreading codes, and transmitting the direct spreading pilot signals from the plurality of transmitting antennas,
   wherein each of the direct spreading codes is the same direct spreading code, a predetermined phase shift per transmitting antenna is given to the pilot data that are spread with the same direct spreading code, and thereafter the pilot signals are transmitted from the plurality of transmitting antennas, and
   guard intervals are attached to within the direct spreading pilot signals in a time domain.

4. The method according to claim 3, wherein the same direct spreading code is an M-sequence (maximum length sequence) code.

* * * * *